United States Patent
Choksi et al.

(10) Patent No.: US 7,973,511 B2
(45) Date of Patent: Jul. 5, 2011

(54) METHOD FOR DISTINGUISHING BATTERIES HAVING DIFFERENT CHEMISTRIES

(75) Inventors: Snehal Choksi, Owings Mills, MD (US); Geoffrey S. Howard, Columbia, MD (US); Daniel J. White, Baltimore, MD (US); Regina Gracia C. Cunanan, Parkville, MD (US); Daniele C. Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 503 days.

(21) Appl. No.: 12/157,973

(22) Filed: Jun. 13, 2008

(65) Prior Publication Data

US 2008/0309284 A1 Dec. 18, 2008

Related U.S. Application Data

(60) Provisional application No. 60/944,135, filed on Jun. 15, 2007.

(51) Int. Cl.
*H02J 7/00* (2006.01)
*H02J 7/04* (2006.01)
*H02J 7/16* (2006.01)

(52) U.S. Cl. ........ 320/106; 320/118; 320/128; 320/157; 320/162

(58) Field of Classification Search .................. 320/106
See application file for complete search history.

(56) References Cited

U.S. PATENT DOCUMENTS

| | | | |
|---|---|---|---|
| 4,388,582 A * | 6/1983 | Saar et al. .................... | 320/156 |
| 5,268,630 A | 12/1993 | Bhagwat et al. | |
| 5,691,620 A * | 11/1997 | Nagai et al. .................. | 320/106 |
| 6,437,539 B2 * | 8/2002 | Olsson et al. ................ | 320/118 |
| 6,504,341 B2 | 1/2003 | Brotto | |
| 6,747,436 B2 | 6/2004 | Brotto | |
| 2006/0103350 A1* | 5/2006 | Lai .............................. | 320/118 |
| 2006/0208701 A1* | 9/2006 | Mikhaylik .................... | 320/128 |

* cited by examiner

*Primary Examiner* — Edward Tso
*Assistant Examiner* — Ahmed Omar
(74) *Attorney, Agent, or Firm* — Michael Aronoff; Adan Ayala

(57) ABSTRACT

A method is provided for distinguishing between batteries having different chemistry compositions. The method includes: supplying electrical energy to the battery for charging thereof; monitoring a voltage characteristic of the battery periodically during charging, wherein the voltage characteristic varies over time with the state of charge of the battery; and identifying the chemistry composition of the battery based on the voltage characteristic of the battery.

4 Claims, 4 Drawing Sheets

METHOD FOR DISTINGUISHING BATTERIES HAVING DIFFERENT CHEMISTRIES

CROSS-REFERENCE TO RELATED APPLICATIONS

This application claims the benefit of U.S. Provisional Application No. 60/944,135 filed on Jun. 15, 2007. The disclosure of the above application is incorporated herein by reference.

FIELD

The present disclosure relates generally to a battery pack and, more particularly, to various charging-related methods for a battery pack.

BACKGROUND

Battery powered devices may utilize batteries having different chemistries. Different battery chemistries have certain advantages relative to each other. For example, NiCd batteries tend to be more economical than NiMh batteries while NiMh batteries may provide more capacity in a similar form and weight as NiCd batteries. While more expensive than either NiCd or NiMh batteries, lithium batteries are lighter and smaller for the same watt hours. Thus, a user may be allowed to choose a battery chemistry which suits their needs.

It is also advantageous that batteries having different chemistries be charged in the same charging device. Since NiCd and NiMh batteries require similar charging methodologies, these batteries can be easily accommodated by the same charging device. On the other hand, lithium batteries require a different charging technique than nickel based batteries. A failure to properly identify the chemistry composition of a battery being charged poses problems. Therefore, it is desirable to provide methods for distinguishing between batteries having different chemistry compositions.

The statements in this section merely provide background information related to the present disclosure and may not constitute prior art.

SUMMARY

A method is provided for distinguishing between batteries having different chemistry compositions. The method includes: supplying electrical energy to the battery for charging thereof; monitoring a voltage characteristic of the battery periodically during charging, wherein the voltage characteristic varies over time with the state of charge of the battery; and identifying the chemistry composition of the battery based on the voltage characteristic of the battery.

In another aspect of this disclosure, a method is provided for validating the voltage monitoring circuit in the battery pack.

Further areas of applicability will become apparent from the description provided herein. It should be understood that the description and specific examples are intended for purposes of illustration only and are not intended to limit the scope of the present disclosure.

DRAWINGS

Figure 1:
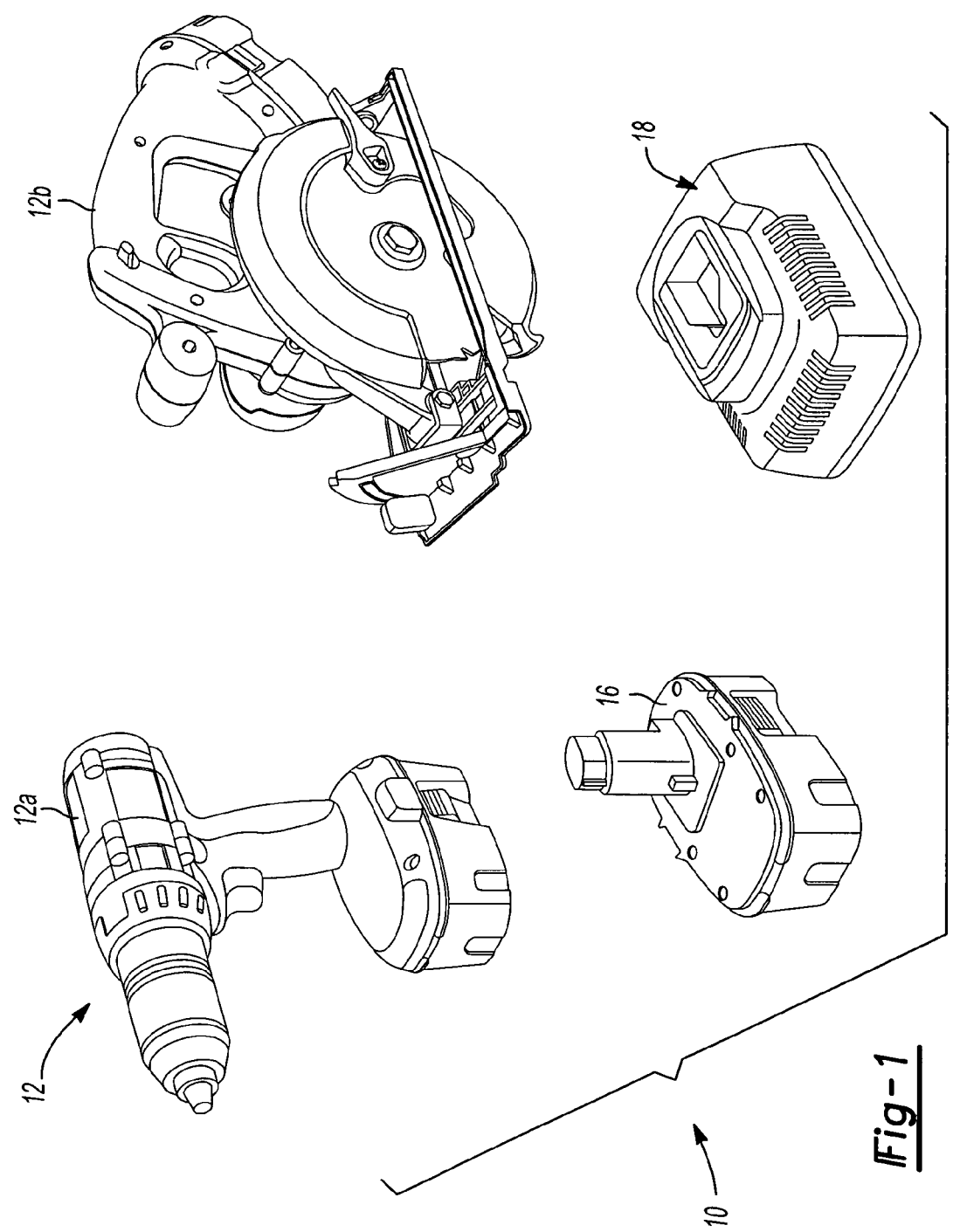
Figure 2:
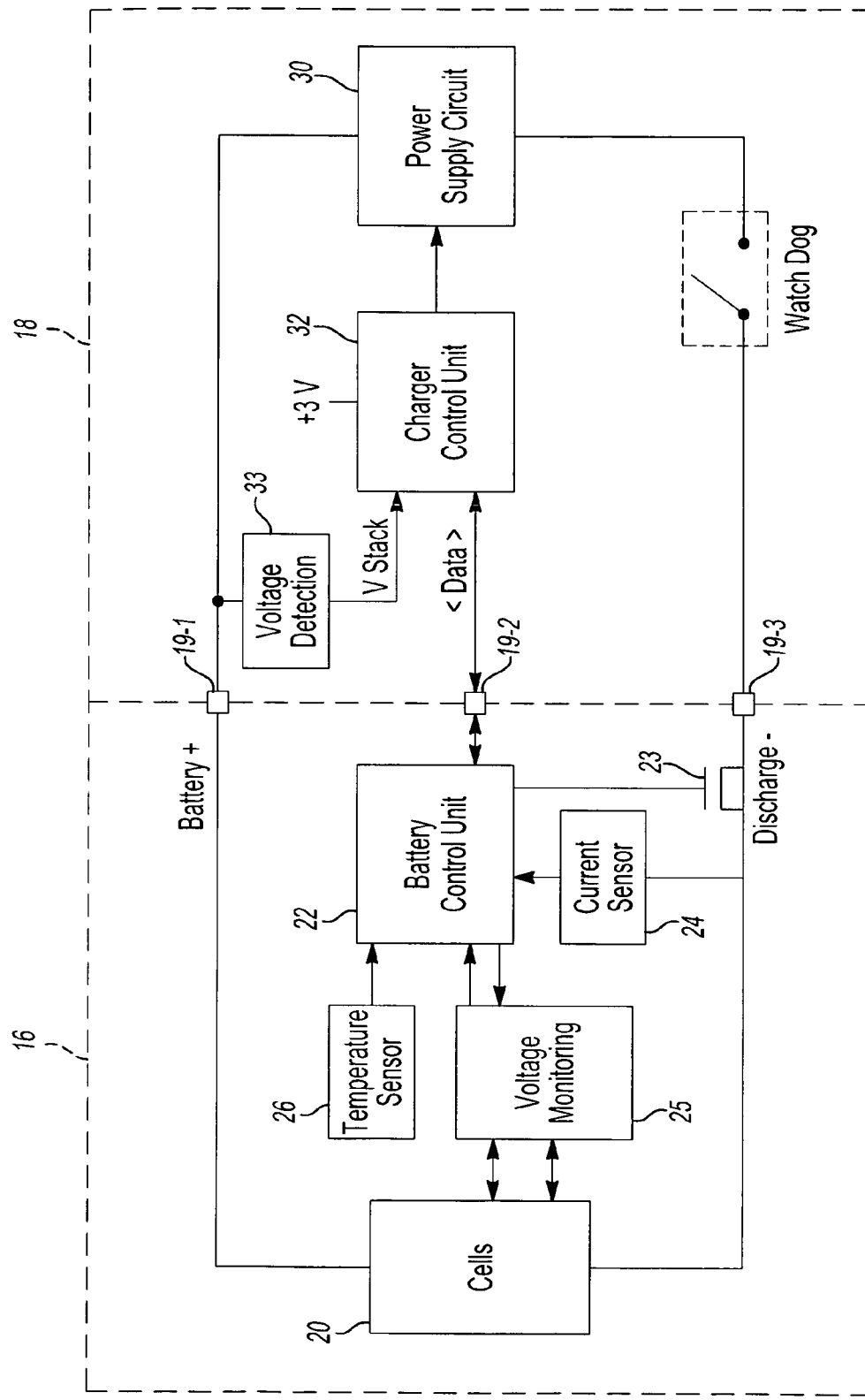
Figure 3:
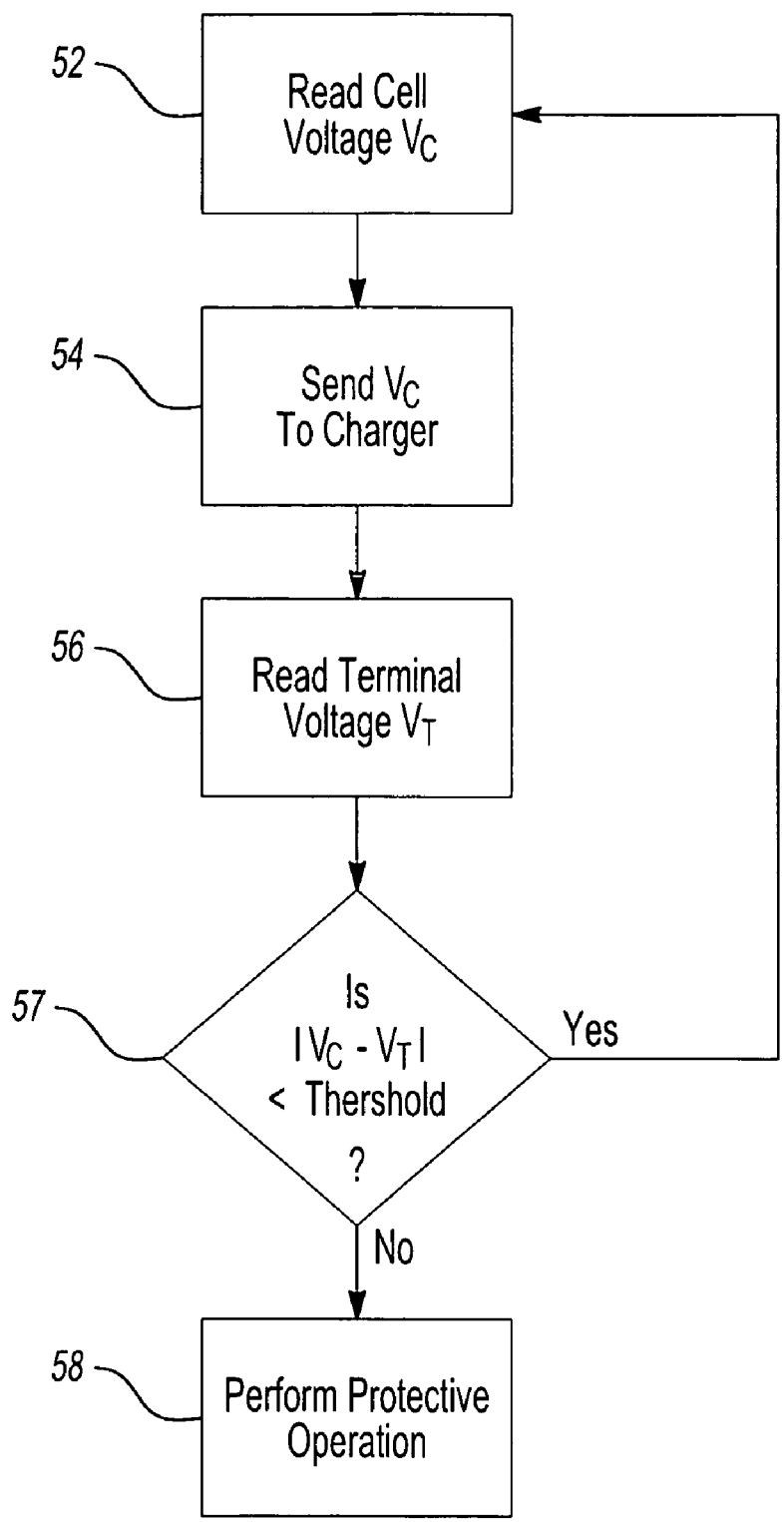
Figure 4:
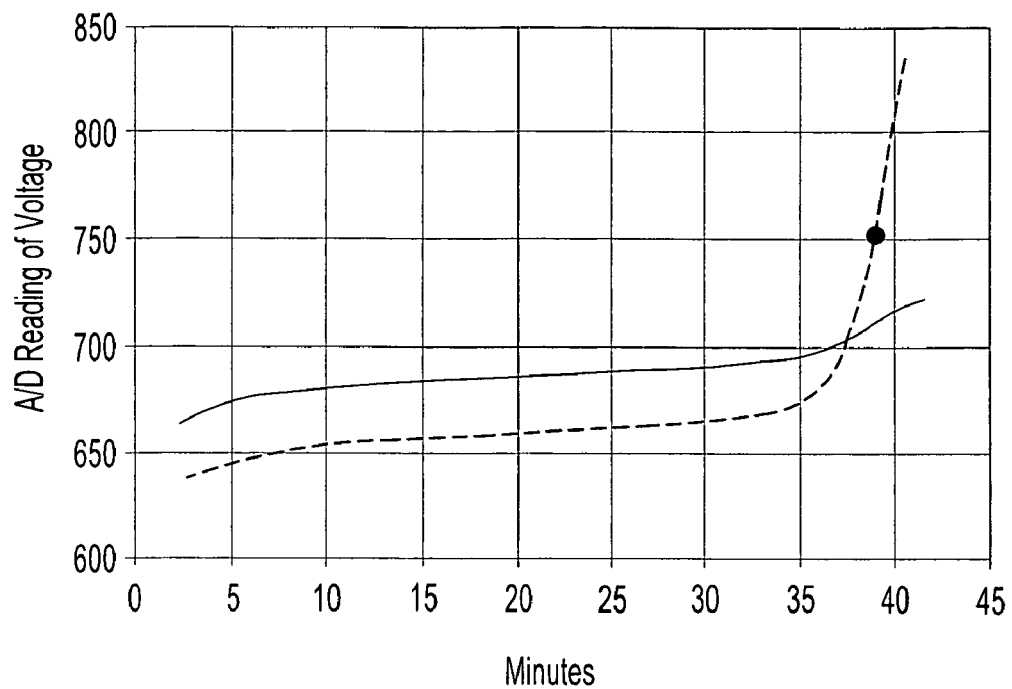
Figure 5:
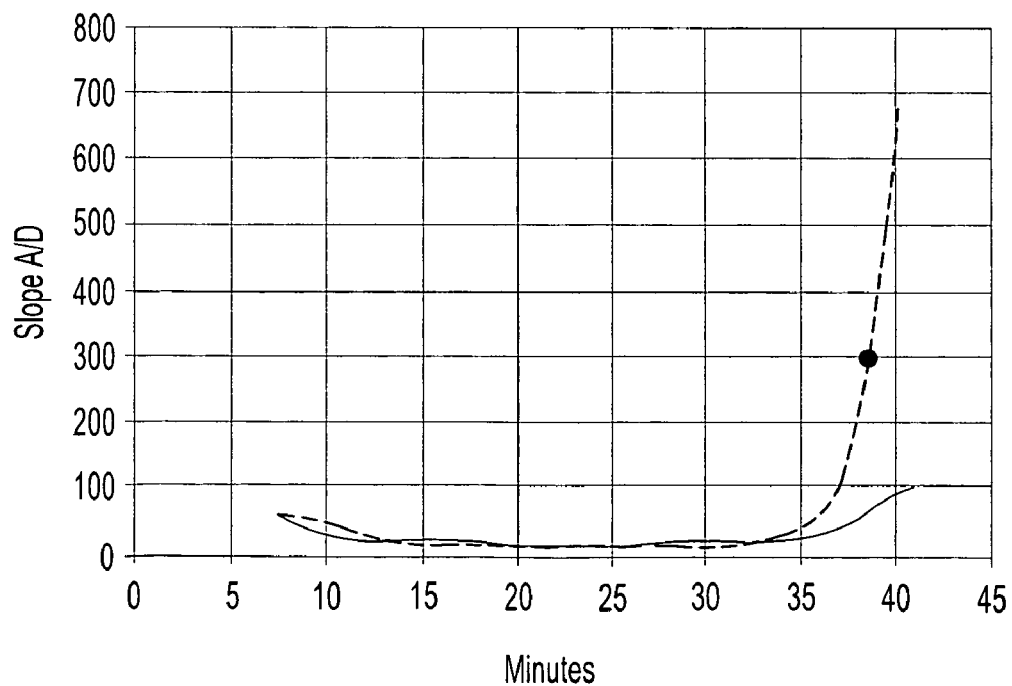

FIG. 1 is a diagram of an exemplary system of power tools;
FIG. 2 is a block diagram of an exemplary configuration for a battery pack operably coupled to battery charger;
FIG. 3 is a flowchart illustrating a method for validating the voltage monitoring circuit in a battery pack;
FIG. 4 a graph illustrating exemplary voltage charge curves for nickel and lithium based batteries; and
FIG. 5 is a graph illustrating the slope of voltage measures shown in FIG. 4.

The drawings described herein are for illustration purposes only and are not intended to limit the scope of the present disclosure in any way.

DETAILED DESCRIPTION

The present disclosure can relate to a system of power tools of the type that is generally indicated by reference numeral 10 in FIG. 1. The system of power tools 10 can include, for example, one or more power tools 12, a battery pack 16 and a battery pack charger 18. Each of the power tools 12 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers. In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The battery pack 16 can be selectively removably coupled to the first and second power tools 12a and 12b to provide electrical power thereto. It is noteworthy that the broader aspects of this disclosure are applicable to other types of battery powered devices.

FIG. 2 illustrates an exemplary configuration of a battery pack 16 operably coupled to a battery charger 18. The battery pack 16 is generally comprised on a plurality of battery cells 20, a battery control unit 22 and various battery control circuits. Except as otherwise described herein, the battery pack 16 can be configured in a manner that is similar to that which is described in U.S. Patent Application Publication No. 2006/0096771 which is hereby incorporated by reference. However, the exemplary configuration is merely provided as a context for describing the various protection methods and circuits disclosed herein.

The battery pack 16 may include a plurality of battery cells 20 connected in series, and/or a plurality of serially-connected strings of cells, in which the strings are in parallel with one another. For purposes of describing the exemplary embodiments, the battery pack may be composed of cells having lithium-ion cell chemistry. In the context of cordless power tools, the nominal voltage rating of the battery pack is typically at least 18 volts. However, other voltage ratings are contemplated for different applications. In addition, the battery pack may be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack. Although not limited thereto, the battery pack 16 is preferably rechargeable.

A battery control unit 22 embedded within the battery pack 16 is responsible for protecting the battery cells and monitoring any fault conditions which may develop. In an exemplary embodiment, the battery control unit 22 is implemented in software on a digital microcontroller. However, the battery control unit 22 may be embodied in hardware or software as a digital microcontroller, a microprocessor or an analog circuit, a digital signal processor or by one or more digital ICs such as application specific integrated circuits (ASICs), for example.

Discharge current from the battery cells and charge current to the battery cells can be clamped or discontinued through the use of a switch 23. The switch 23 may be placed in series with the battery cells on the low voltage side of the battery cells. The switch 23 can then be controlled by the battery control unit 22 to interrupt current flow to/from the battery cells. In an exemplary embodiment, the switch 23 is a transistor (e.g., a MOSFET). Other types of switches are also contemplated by this disclosure.

A current sensor 24 is configured to sense the current being supplied by the battery and provide a signal indicative of the sensed current to the battery control unit 22. In an exemplary embodiment, the current sensor 24 may be implemented using a current shunt disposed in series with the battery cells 20. The current shunt is preferably positioned on the low voltage side of the battery cells. In an alternative embodiment, the switch 23 is used as the current sensor (see FIG. 3). In other words, the battery control unit 22 monitors the current being drawn across the switch 23. In the case of the transistor, the current is measured using the resistance $R_{on}$ as a current shunt that converts the current into a voltage that can be read by the battery control unit. Other types of current sensors (e.g., a Hall effect current sensor) are also within the scope of this disclosure.

A voltage monitoring circuit 25 may be configured to sense individual cell voltage and sense total pack voltage of the cells 20. The voltage monitoring circuit provides a signal representing the individual cell or stack voltage to the battery control unit 22. Alternatively, the battery control unit 22 may direct the voltage monitoring circuit to periodically measure the cell voltage across each cell of the pack and the total pack voltage in a sequential manner. A current average cell voltage may be determined by dividing the measured total pack voltage by the number of cells in the pack. The battery control unit 22 may in turn interface with a cell balancing module to control the balancing of cell voltages during the charging process. An exemplary voltage monitoring arrangement is further described in U.S. Patent Application Publication No. 2006/0071643 which is hereby incorporated by reference.

A temperature sensor 26 may be configured to measure the temperature of the battery cells. The temperature sensor in turn communicates the measure temperature to the battery control unit 22. The temperature sensor may be implemented with negative temperature coefficient (NTC) thermistor, a positive temperature coefficient (PTC) thermistor, temperature sensing integrated circuits, or thermocouples.

The battery pack 16 is selectively coupled to a battery pack charger 18. The battery pack charger 18 is generally comprised of a power supply circuit 30 and a charger control module 32. The battery pack charger may include a terminal voltage detection circuit 33 and a watchdog circuit 34. It is envisioned that other sensing and/or protections circuits may also be incorporated in the battery charger. However, this exemplary configuration is merely provided as a context for describing the various protection methods and circuits disclosed herein.

The charger control module 32 is responsible for charging the battery cells and monitoring any fault conditions which may develop. In an exemplary embodiment, the charger control module 32 is implemented in software on a digital microcontroller. However, the charger control module 32 may be embodied in hardware or software as a digital microcontroller, a microprocessor or an analog circuit, a digital signal processor or by one or more digital ICs such as application specific integrated circuits (ASICs), for example.

Charger control module 32 and battery control unit 22 may exchange data through a data terminal 19-2. This data terminal provide a serial data link between the two control units. Diagnostic measures made in the battery pack 16 may be passed by the battery control unit 22 to the charger control module 32. Conversely, control parameters may be passed from the charger control module 32 to the battery control unit. Exchanged data may include but is not limited to an identifier for the charger and/or battery pack, individual or total stack voltage are determined by the pack, temperature conditions in the pack, etc. Other types of communications are also contemplated by this disclosure.

In one aspect of this disclosure, the voltage monitoring circuit 25 in the battery pack 16 may be validated by the battery charger 18. In support of this function, a voltage measurement circuit 33 is interposed between the charging terminal 19-1 of the battery charger 18 and the charger control module 32. The voltage measurement circuit 33 is operable to measure the voltage at the charging terminal. The voltage measurement circuit may be implemented as a conventional voltage attenuation circuit as is readily known in the art and need not be described further.

A method for validating the voltage monitoring circuit in the battery pack is shown in FIG. 3. Voltage across the battery cells is periodically measured at 52 by the voltage monitoring circuit 25 residing in the battery pack 16 as described above. The battery control module 22 in the pack in turn communicates 54 the voltage reading to the battery charger 18. Alternatively, the charger control module 32 may prompt the battery control module 22 to send the voltage reading. In either case, the voltage reading is communicated from the battery pack 16 via the data terminal 19-2 to the battery charger 18.

The charger control module also reads 56 the voltage at the charging terminal of the battery pack. The voltage reading at the charging terminal is then compared at 57 to the voltage reading reported by the battery pack. When the difference between the voltage readings is within some predefined tolerance (e.g., within 3% of each other), both voltage monitoring circuits are presumed operational and no further action is required. On the other hand, when the difference between the voltage readings exceeds the predefined tolerance, one of the two voltage monitoring circuits is not functioning properly. In this case, a protective operation, such as terminating the charging function, is implemented as indicated at 58. The protective operation may be implemented by the charger control module and/or by the battery control unit. In addition, an indication of the fault condition may be provided to the user. In this way, operation of the voltage monitoring circuit may be verified to ensure safer battery charging.

FIG. 4 illustrates exemplary voltage charge curves for a $LiFePO_4$ battery (dashed line) and a NiCd battery (solid line). These curves were obtained while both batteries were being charged with a constant current source (e.g., 3 amp). It appears as though an absolute voltage comparison could be made to distinguish between the two chemistries in this example. In practice, variations in component tolerance, temperature, etc. would conspire to obscure these absolute differences. Furthermore, many chargers are capable of charging batteries with a range of nominal voltages which further casts ambiguity on target voltage thresholds. Thus, using absolute voltage measures to distinguish between battery chemistries is not practical.

For comparison purposes, FIG. 5 plots the slope of the voltage measures shown in FIG. 4. Note that the maximum slope value for the NiCd battery is around 30; whereas the maximum slope value for the Li battery continues rising above 200. Thus, the lithium battery may be distinguished from nickel-based batteries by monitoring the slope of charge curve while the battery is being charged with a constant current. While reference is made to particular battery chemistries, it is readily understand that this identification technique is applicable to batteries having other types of chemistries.

To generate the slope curve, the battery control unit 22 monitors the voltage characteristic of the battery periodically during the charging process. Voltage measures are provided by the voltage measuring circuit 25 and may be sampled at periodic time intervals (e.g., every 19 seconds). In an exemplary embodiment, the voltage measures are stored in a FIFO stack residing in a memory associated with the battery control unit.

The slope of the charge curve is obtained by subtracting an old voltage value from a new voltage value to get a voltage difference between the two voltage values. In the exemplary embodiment, the slope of the charge curve may be computed over a plurality of voltage measures. For example, assuming a stack of sixteen values, $V_{old}$ is calculated as an average voltage value of the eight oldest values and $V_{new}$ is calculated as an average voltage value of the eight newest values. An average of several voltage measures reduces the effects of noise. U.S. Pat. No. 5,268,630 issued to Bhagwat et al. teaches varying the stack size to achieve different criteria. For instance, a large stack may be used when the slope to provide good noise immunity and gain and then switching to a small stack when the slop is large to achieve a faster response. Teachings of the '630 patent are incorporated herein by reference.

In one exemplary embodiment, the chemistry composition of the battery is identified based on the slope value alone. The battery chemistry is presumed to be nickel based as long as the slope remains below a predefined threshold (e.g., 100). When the slope exceeds the threshold, the battery chemistry is identified as lithium based. It is further contemplated that the predetermined threshold may correlate to the point at which to terminate the charging process.

In another exemplary embodiment, the chemistry composition of the battery cells is determined from inflection points in the slope curve. U.S. Pat. No. 4,388,582 issued to Saar teaches when to terminate battery charging of a nickel-based battery based on inflection points in the slope curve. In short, Saar teaches to terminate charging at a second inflection point that follows a first inflection point on the curve. Further details regarding this technique may be found in the '582 patent which is incorporated herein by reference.

Prior to the first inflection point, the slope curve for lithium based batteries is similar to nickel based batteries. After the first inflection, the amplitude of the curve for lithium based batteries far exceeds nickel based batteries. Moreover, the curve for lithium based batteries does not exhibit a second inflection point. Therefore, the battery chemistry may be identified as lithium based when a second inflection point is not detected within a defined period of time (e.g., 3 seconds) following a first inflection point. Conversely, the battery chemistry may be identified as nickel based when the second inflection point does follow the first inflection point within the defined time period. An identification scheme which combines these two techniques is also contemplated. Moreover, it is envisioned that one or both of these identification techniques may cooperatively operate with other types of identification schemes to formulate a decision as the chemistry composition of a battery.

The battery control unit 22 may then control the energy supplied to the battery cells based on the identified chemistry of the cells. For instance, the battery control unit may select an applicable charge termination routine based on the identified chemistry. In addition, the battery control unit may implement other protective operations which are particularly suited to a particular battery chemistry. Alternatively, the battery control unit 22 may communicate the identification of the battery chemistry to the battery charger which in turn implements applicable procedures for the battery type.

The above description is merely exemplary in nature and is not intended to limit the present disclosure, application, or uses.

What is claimed is:

1. A method for distinguishing between batteries having different chemistry compositions, comprising:
   supplying electrical energy to the battery for charging thereof;
   monitoring a voltage characteristic of the battery periodically during charging, wherein the voltage characteristic varies over time with the state of charge of the battery;
   identifying the chemistry composition of the battery based on the voltage characteristic of the battery,
   wherein identifying the chemistry composition further comprises identifying a first inflection point exhibited in the voltage characteristic of the battery and identifying the chemistry composition as a lithium based chemistry when a second inflection point is not detected within a defined period of time following the first inflection point.

2. A method for distinguishing between batteries having different chemistry compositions, comprising:
   supplying electrical energy to the battery for charging thereof;
   monitoring a voltage characteristic of the battery periodically during charging, wherein the voltage characteristic varies over time with the state of charge of the battery;
   identifying the chemistry composition of the battery based on the voltage characteristic of the battery and determining a slope of the variation in the voltage characteristic and identifying the chemistry composition of the battery based on the slope,
   wherein identifying the chemistry composition further comprises identifying a first inflection point exhibited in the voltage characteristic of the battery and identifying the chemistry composition as a lithium based chemistry when a second inflection point is not detected within a defined period of time following the first inflection point and the slope exceeds a threshold.

3. A method for distinguishing between batteries having different chemistry compositions, comprising:
   supplying electrical energy to the battery for charging thereof;
   monitoring a voltage characteristic of the battery periodically during charging, wherein the voltage characteristic varies over time with the state of charge of the battery;
   determining a slope of the variation in the voltage characteristic; and
   identifying the chemistry composition of the battery based on the slope of the voltage characteristic of the battery,
   wherein identifying the chemistry composition further comprises identifying a first inflection point exhibited in the voltage characteristic of the battery and identifying the chemistry composition as a lithium based chemistry when a second inflection point is not detected within a defined period of time following the first inflection point.

4. A method for distinguishing between batteries having different chemistry compositions, comprising:

supplying electrical energy to the battery for charging thereof;

monitoring a voltage characteristic of the battery periodically during charging, wherein the voltage characteristic varies over time with the state of charge of the battery;

determining a slope of the variation in the voltage characteristic; and identifying the chemistry composition of the battery based on the slope of the voltage characteristic of the battery, wherein identifying the chemistry composition further comprises identifying a first inflection point exhibited in the voltage characteristic of the battery and identifying the chemistry composition as a lithium based chemistry when a second inflection point is not detected within a defined period of time following the first inflection point and the slope exceeds a threshold.

* * * * *